Figure 1:
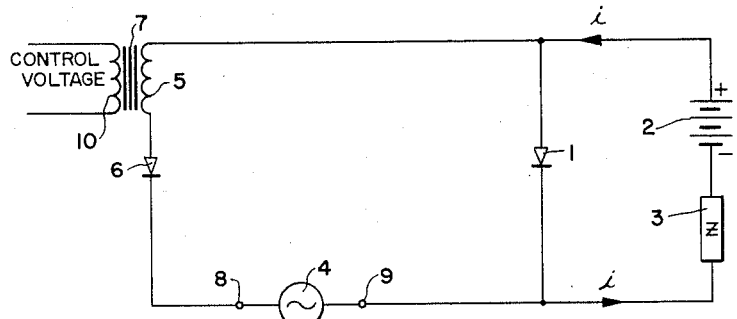

Aug. 12, 1958      C. W. E. WALKER ET AL      2,847,634
VOLTAGE AND SPEED REGULATING APPARATUS
Filed Dec. 6, 1954                                3 Sheets-Sheet 1

INVENTORS
CHARLES W. E. WALKER
OLIVER M. JULSON
BY
Fetherstonhaugh & Co.
ATTORNEYS Aug. 12, 1958   C. W. E. WALKER ET AL   2,847,634
VOLTAGE AND SPEED REGULATING APPARATUS
Filed Dec. 6, 1954   3 Sheets—Sheet 3

INVENTORS
CHARLES W. E. WALKER
OLIVER M. JULSON
BY
Fetherstonhaugh & Co.
ATTORNEYS

United States Patent Office 2,847,634
Patented Aug. 12, 1958

2,847,634

VOLTAGE AND SPEED REGULATING APPARATUS

Charles W. E. Walker, Powell River, British Columbia, and Oliver M. Julson, Westview, British Columbia, Canada, assignors to Powell River Company Limited, Vancouver, British Columbia, Canada, a corporation of British Columbia Application December 6, 1954, Serial No. 473,376

5 Claims. (Cl. 322—28)

This invention relates to apparatus for regulation of a direct current (D. C.) operated machine, such as a D. C. generator or a D. C. motor. The invention provides for reducing unwanted variation in the output voltage of a D. C. generator or in the speed of a D. C. motor which may be produced by any cause or causes, singly or in combination, such as variations in the load current, variations in the rotational speed of the armature or variations in the field supply voltage.

In many of the applications of D. C. generators it is required that their output voltage be maintained as nearly constant as possible, as, for example, when they are used to power D. C. motors of which the speed, once set, should not fluctuate. It is often desirable to regulate the speed of a D. C. motor itself.

In some instances it has been the practice in the past to regulate the output voltage of a generator by causing the generator field current to vary in such a way that this variation tends to vary the generator output voltage in opposition to and so as to cancel unwanted variations. If the generator output voltage increases due to some cause, the field current is made to decrease thereby tending to reduce the generator output voltage, in opposition to the unwanted increase. Several methods of automatic control embodying this principle are known in the prior art and which involve a means of detecting any change in the generator output voltage and using this change to actuate a mechanical and/or electrical device which suitably varies the field current. Such systems are of the type known generally as closed loop control systems. Various mechanical and/or electrical devices for effecting this control are well known in the prior art, but these suffer from one or other or a combination of the disadvantages of (I) being too slow in their operation to be effective against rapidly occurring voltage fluctuation, (II) having insufficient loop gain, free from hunting, to reduce output voltage fluctuations to within the required tolerance, (III) having high complexity and cost.

An object of the present invention is to provide new and improved apparatus for controlling regulation of a direct current operated machine such as a D. C. generator or a D. C. motor by means of a closed loop control system.

A further object of the invention is to provide means of supplying from the control apparatus to the total field circuit of a generator only the power essential for output voltage control purposes, the same field circuit being supplied concurrently with the power necessary for generator operation from another source, which may be the generator output.

A still further object is the provision of means of supplying from the control apparatus to the total field circuit of a motor only the power necessary for speed control purposes, the same field circuit being supplied concurrently with the power necessary for motor operation from another source.

An ancillary object of the invention is to provide for zero output voltage across the output terminals of the control apparatus when the generator voltage is at its required value so that the operation of the whole system can readily be stabilized by the application of negative feedback.

There are some D. C. generators that have only one field winding which is used for excitation purposes but which can also be used for control purposes. There are, also, other D. C. generators that have two field windings, one for excitation purposes and the other for control purposes. Some control apparatus can only be used on the latter type of generator or, in other words, requires a separate field winding for control purposes. It is a feature of our invention that it does not require such a separate winding and may be used on either type of generator.

In a single closed loop control system, the amount by which unwanted fluctuations of the controlled quantity are reduced is proportional to the loop gain of the system. To avoid oscillation, or hunting, in such a loop having high loop gain it is necessary that one element in the system have a time constant substantially greater than those of the remaining elements. In the control of a generator through its field current there is an inherent time constant produced by the inductance of the field winding. To obtain the most rapid response possible in the control system, combined with large loop gain and freedom from hunting, it is necessary to make the time constants of all other elements in the loop short compared to this time constant of the field inductance. This is not, in general, possible in a system containing a mechanical link but can be achieved with control systems which are wholly electrical or electronic in their operation, provided the output power required from the control apparatus is not too large.

The complexity and cost of the control apparatus increases rapidly with the output power required from it and for large generators the field power requirements are considerable. The conditions of operation of a generator are seldom, however, such that it is necessary to vary the field current by more than a few percent to provide effective control. It is, therefore, only essential for the control apparatus to supply a portion of the power consumed by the field. By supplying only this portion of the power from the controller, substantial savings in control apparatus can be achieved in the control of generators both large and small. Electrical and electronic control systems that have been available in the past suffer from the disadvantage that they must either supply the total field power consumed by the generator field or the generator must be specially constructed in that it has an auxiliary field winding for control purposes and which must be designed to suit the control system. This latter alternative is not readily applicable to existing generators.

According to the present invention, the output stage of the control apparatus consists of a magnetic amplifier. The magnetic amplifier is arranged so that a direct current can flow uninterrupted through its primary circuit, with negligible power loss and with negligible effect on the normal operation of the magnetic amplifier. It is this feature which enables the magnetic amplifier to inject controlling signals into the field circuit of the D. C. generator while the main field power for the generator is supplied from another source.

Figure 2:
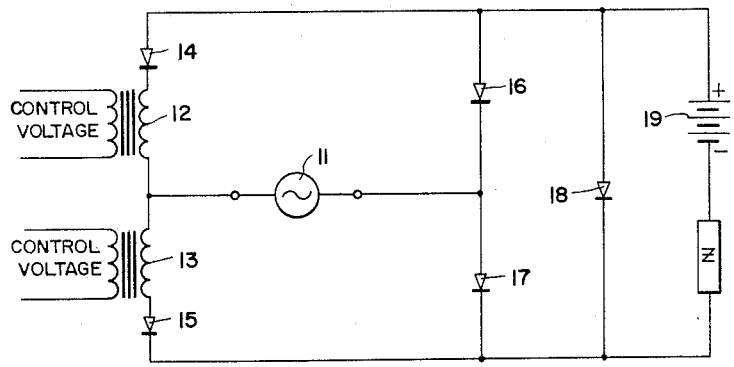
Figure 3:
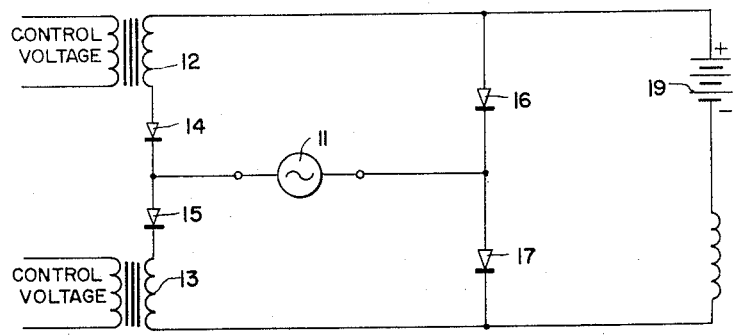
Figure 4:
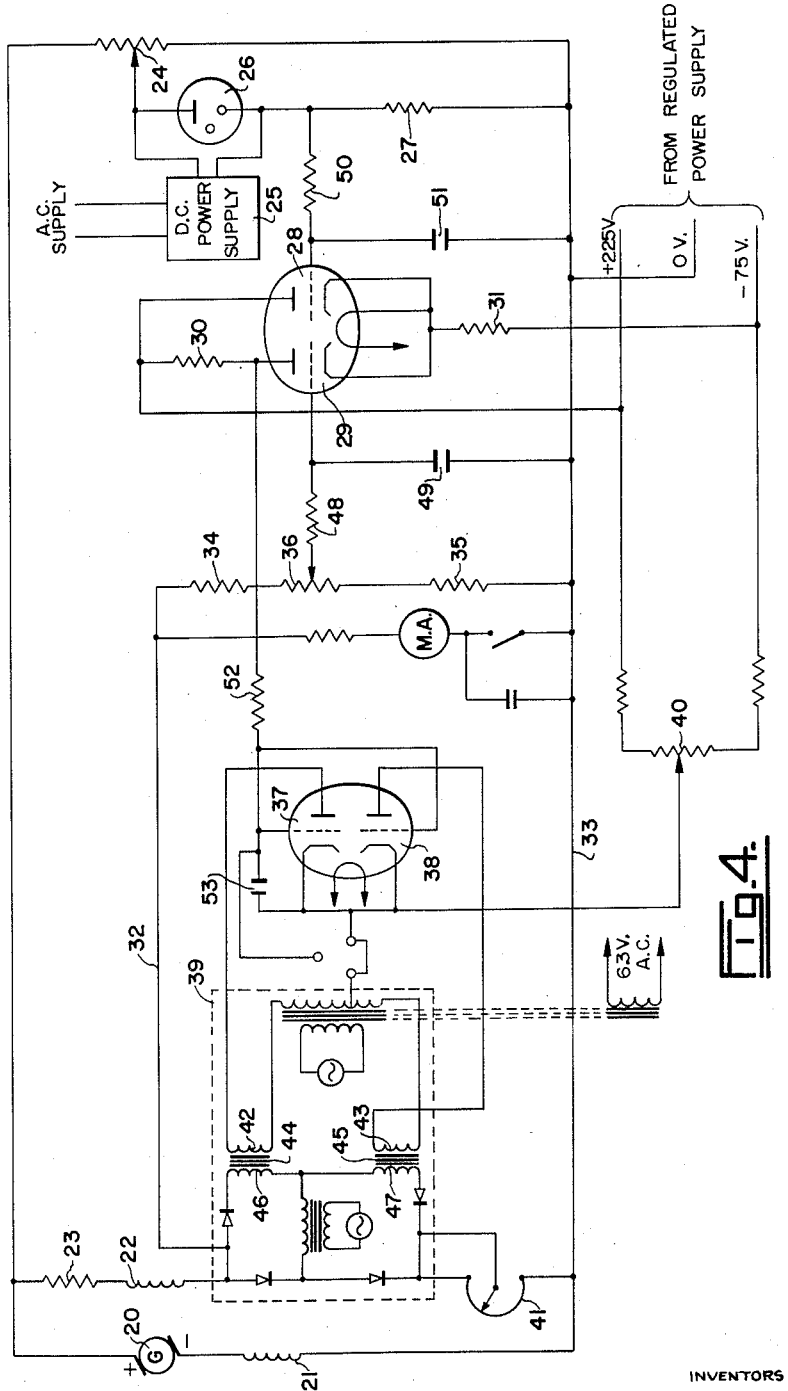
Figure 5:
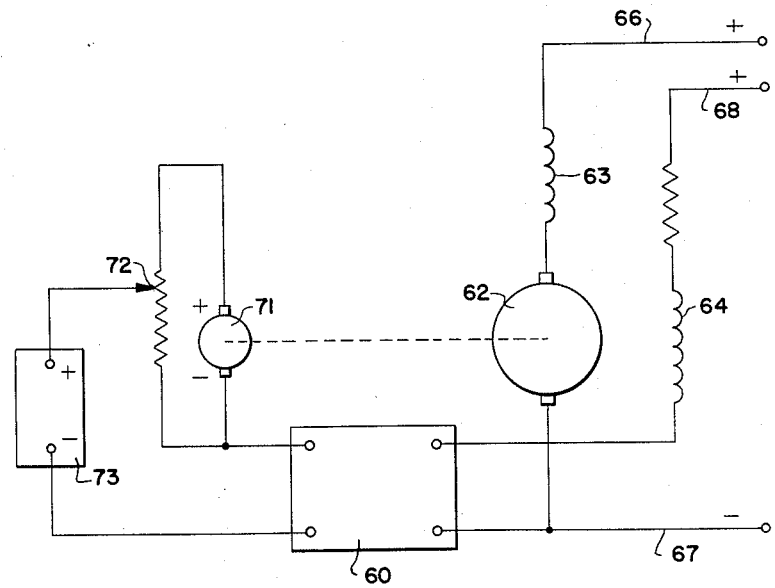

The invention will be further described with reference to the accompanying drawings, in which, Figure 1 shows diagrammatically the basic half wave magnetic amplifier circuit, Figure 2 shows diagrammatically the equivalent full wave magnetic amplifier circuit, Figure 3 diagrammatically illustrates a variation of the full wave magnetic amplifier circuit, Figure 4 shows diagrammatically a voltage amplifier used in conjunction with a full wave magnetic amplifier circuit, and Figure 5 illustrates diagrammatically a circuit used for controlling the speed of a D. C. motor.

Referring to Figure 1 of the drawings, the basic circuit of the magnetic amplifier is the same as that, known in the prior art, as the self-saturating magnetic amplifier, except for the addition of a rectifier 1. The external circuit is shown as a battery 2 in series with a load impedance 3. The method of operation of the remaining elements in the circuit is the same as that described in the prior art pertaining to magnetic amplifiers and will not be repeated here in detail. The following brief description will serve to describe the operation of the circuit and, in particular, the function of the added rectifier 1.

During a portion of each cycle of the A. C. source 4, the impedance of that part of the circuit containing the magnetic amplifier primary winding 5, the rectifier 6 and the A. C. source 4 is high due to the high inductance of the primary winding 5, which exists when the magnetic amplifier core 7 is not saturated, or to the high reverse resistance of rectifier 6 which exists when terminal 8 of the A. C. source 4 is positive with respect to terminal 9. During this portion of each cycle of A. C., the added rectifier 1 offers a low resistance path for the external circuit current "$i$." During the remaining portion of the A. C. cycle, when the core 7 is saturated and terminal 9 of the A. C. source 4 is positive with respect to terminal 8, rectifier 1 has the instantaneous A. C. voltage applied to it in its non-conducting or high resistance direction, and therefore ceases to offer a low resistance current path.

At the same time, the part of the circuit containing the primary winding 5, the rectifier 6, and the A. C. source 4 offers a low impedance to the passage of the external circuit current "$i$" and the instantaneous A. C. voltage is added to that of the battery 2. The voltage applied to the external load 3 is thereby increased during this portion of each cycle of A. C. The mean increase in voltage and likewise the mean increase in the current "$i$," taken over a whole cycle of A. C. is a function of the fraction of the A. C. cycle during which the core 7 is saturated. This, in turn, is controlled by the secondary circuit 10 of the magnetic amplifier.

Referring to Figure 2 of the drawing, the A. C. source 11, the magnetic amplifier cores and windings 12 and 13 and the rectifiers 14, 15, 16 and 17 constitute and act in like manner to a full wave self-saturating magnetic amplifier bridge circuit whose method of operation is described in the prior art and which is one full wave equivalent of the half wave circuit of Figure 1 consisting of A. C. source 4, core 7 with windings 5 and 10 and rectifier 6. The added rectifier 18 in Figure 2 is the equivalent of the rectifier 1 of Figure 1. It will be noted that, since rectifier 18 is in parallel with rectifiers 16 and 17 in series, it is possible to obtain some economy by omitting rectifier 18 as a separate unit and increasing the current ratings of rectifiers 16 and 17 to enable them to fulfil the dual function.

With rectifier 18 omitted as a separate unit the only physical difference between this embodiment of this part of the invention and the corresponding normal full wave self-saturating magnetic amplifier bridge circuit is in the current ratings of rectifiers 16 and 17. The essential difference in the principle of operation must not, however, be overlooked, particularly when considering other possible embodiments of the invention. This is clearly illustrated by the fact that for normal operation of a full wave self-saturating magnetic amplifier as known and used in the past, the primary windings on the magnetic amplifier cores may be placed in any pair of adjacent arms of the bridge, that is, referring again to Figure 2, in series respectively with rectifiers 14 and 15, or 14 and 16, or 16 and 17, or 17 and 15, whereas for operation in accordance with the present invention, if the magnetic amplifier primary windings were placed in series respectively with rectifiers 14 and 16, or with 17 and 15, the function of the added rectifier 18 could not be performed by any of the bridge rectifiers and, more important, the operation of the magnetic amplifier would be completely upset by the presence of the external D. C. source 19, which would operate to maintain continuous saturation, alternating between the two magnetic amplifier cores, whether rectifier 18 is added or not.

It is noted that, since rectifier 14 and the magnetic amplifier primary winding 12 are in simple series connection, with no other connections to the common connection between them, their order of connection may, of course, be interchanged. This is true also of rectifier 15 and magnetic amplifier primary winding 13, so that the circuit may equally well be drawn as in Figure 3.

In the preferred embodiment of the invention, for the control of the output voltage of a D. C. generator, the control windings of the magnetic amplifier are supplied with electric voltage and current signals which are derived in the first place from the output voltage of the generator backed off against a constant reference voltage and are amplified as required to provide the desired control.

A complete understanding of the whole invention will be had from the following detailed description of one embodiment therefor, when read in conjunction with Figure 4, which shows diagrammatically the circuit used for the control of a 250-volt self-excited D. C. generator having a power output of 35 kw. The control was required to hold the output voltage constant within 3 parts in a thousand despite fluctuation in drive and load which, without control, produced peak output voltage fluctuations of 10%. There was no indication that this represented the limit of the accuracy to which the output voltage could be held by the methods of the invention.

The D. C. generator 20 is excited, in accordance with standard practice, by a series field winding 21 and a shunt field winding 22 which is fed from the generator output in series with a fixed resistor 23.

For regulation of the armature output voltage, in accordance with the present invention, a potentiometer 24 is connected across the generator output. From the slider and one end of this potentiometer a portion of the output voltage is obtained, which is backed off against a constant reference voltage obtained from a power supply 25 and voltage-regulator tube 26. The difference voltage is developed across the resistor 27, which has a resistance value large compared to that of the potentiometer 24 and the regulator tube 26. The position of the slider of the potentiometer is adjusted so that this difference voltage is zero when the generator output voltage is at its correct value. An error in the generator output voltage will then produce an error voltage across resistor 27, proportional to and in the same phase as the error in the generator output voltage. To provide for zero adjustment, potentiometer 24 is preferably of the multi-turn type.

An error voltage appearing across resistor 27 is applied to the control grid of vacuum tube 28 which, together with vacuum tube 29, and resistors 30 and 31, is connected as a long-tailed pair. This acts as a D. C. amplification stage producing an amplified version of the error voltage in the plate circuit of vacuum tube 29. The long-tailed pair circuit has good inherent stability which may be further improved by supplying the plate-cathode circuits of vacuum tubes 28 and 29 from a regulated power supply. The overall stability of this stage and of the later stages of the apparatus may be still further improved by feeding back a portion of the mean final output voltage to the control grid of vacuum tube 29, the phase of this feedback voltage being such as to reduce the resultant overall gain of the apparatus. In this case, the output voltage of the control apparatus is fed back to the grid of vacuum tube 29 over the feedback line 32 and the base line 33 and is developed across the voltage divider chain consisting of resistors 34 and 35 and potentiometer 36. If the feedback voltage applied to the control grid of vacuum tube 29 is increased the overall gain of the apparatus is reduced. Potentiometer 36 therefore acts as a gain control.

The amplified error voltage in the plate circuit of vacuum tube 29 is applied to the control grids of vacuum tubes 37 and 38 simultaneously. These tubes, together with the magnetic amplifier 39, operate according to the circuit due to R. A. Ramey (Ref. NRL Report 3869, October 24, 1951) except for the special requirement for injecting the amplified error voltage into the shunt field circuit of the generator, in accordance with the principles described with reference to Figures 1 and 2 of the drawing. The mean output voltage obtained from the magnetic amplifier can vary between zero and some value v. The zero error operating point for this output voltage is adjusted to ½ v. by adjustment of potentiometer 40 which sets the zero error grid-cathode voltage of tubes 37 and 38. At the same time the resistance value of rheostat 41, connected in series with the generator shunt field, is adjusted so that the voltage developed across it by the shunt field current is equal to ½ v. Since this voltage is in opposition to that obtained from the magnetic amplifier, the net zero error means voltage added to the field circuit is zero as also the voltage fed back via the feedback line 32 and base line 33.

The phase relationships through the control apparatus are such that when the generator output voltage is above the correct value there is a positive error voltage which applies a positive voltage increment to the control grid of vacuum tube 28, which produces a positive amplified error voltage at the plate of vacuum tube 29 which applies a positive voltage increment to the control grids of vacuum tubes 37 and 38, which reduces their effective plate-cathode impedance during their respective conducting half cycles of the A. C. supply. This results in a larger voltage time integral being applied to the secondary winding 42 and 43 and therefore more resetting of the cores 44 and 45. The result is that, during the respective ensuing half cycles when voltages are applied to windings 46 and 47, the cores will take longer to saturate. Voltage will therefore be added to the shunt field circuit for a shorter portion of each half cycle and the mean voltage in the shunt field circuit will be less, resulting in less field current and less excitation which tends to reduce the generator output voltage and so to reduce the error. At the same time, the reduced mean output voltage from the magnetic amplifier means that the mean voltage of the feedback line 32, if the latter is used, is positive with respect to the base line 33 so that a positive feedback voltage is applied to the control grid of vacuum tube 29, which is in the right phase to reduce the gain of the long-tailed pair voltage amplification stage.

Similarly, when the generator output voltage is below the correct value, the shunt field current will be increased, resulting in greater field current and greater excitation which tend to increase the generator output voltage and so to reduce the error.

Alternating potentials of twice A. C. supply frequency and harmonics of this, are present on the feedback line 32, with sufficiently large amplitudes to overload the vacuum tube circuits. Commutator ripple and other unwanted high frequencies can likewise be present, with similar amplitudes, in the input to the control apparatus. Low pass filters can be inserted to reduce these and are represented in the diagram by resistor 48 and condenser 49 in the control grid circuit of vacuum tube 29, by resistor 50 and condenser 51 in the control grid circuit of vacuum tube 28 and by resistor 52 and condenser 53 in the circuit of the control grids of vacuum tubes 37 and 38. The resistor elements in these filters have the added function of grid stoppers and serve the purpose of safeguarding the vacuum tubes against the damaging effects of possible excessive voltages on their control grids.

The basic response time of the Ramey magnetic amplifier circuit is half a cycle of supply A. C. The response time of the electronic amplification stages is approximately the same as this, being set by the low pass filters included in the control grid circuits. These response times are many times shorter than that due to the inductance of the generator shunt field winding which is one of the desired conditions for good generator voltage control.

While the above-described apparatus is well adapted to maintain a constant output voltage from a self-excited D. C. generator it is equally well adapted to methods of excitation in which the shunt field is supplied from a separate D. C. source. Further, while the novel magnetic amplifier output circuit described above is particularly well adapted to working into the shunt field of a D. C. generator, both by itself and in conjunction with one, several or all of the other parts of the above-described apparatus or of parts fulfilling a similar function it may readily be used for working into any circuit in which electric current is flowing from an external source, such as the shunt field of a D. C. motor. Further, while the Ramey magnetic amplifier circuit is particularly well suited to fulfill the power output requirements of the apparatus and is particularly suitable for adaptation in accordance with the invention, other forms of magnetic amplifier circuit may be used. Further, while the electronic vacuum tube circuits in the apparatus described above are well suited to fulfil their amplification requirements in the apparatus, other forms of amplification circuit may be used such as other vacuum tube circuits, or circuits using transistors, or magnetic amplifier circuits.

Figure 5 shows diagrammatically a circuit which may be used for controlling the speed of (that is, regulating) a D. C. motor. The amplifier 60 is identical to the amplifier of Figure 4 comprising the whole of Figure 4 less the generator components 20, 21, 22 and 23, and less the input components 24, 25 and 26.

The D. C. motor 62 is excited, in accordance with standard practice, by a series field winding 63 and a shunt field winding 64. The armature and shunt field circuits are here shown fed from separate D. C. supplies represented by the armature bus lines 66 and 67 and the field bus lines 68 and 67. The output circuit of the amplifier 60 is connected in series with the shunt field winding 64 of the D. C. motor in exactly similar manner to that shown in Figure 4 where the output circuit is connected in series with the shunt field winding 22 of the D. C. generator.

For regulation of the speed of the D. C. motor in accordance with the present invention, a tachometer generator 71 is driven by the motor 62. This tachometer generator produces a D. C. voltage which is proportional to the speed at which it is driven and, accordingly, proportional to the speed of the D. C. motor that is driving it. A portion of this voltage is obtained from a potentiometer 72, which is connected across the tachometer generator, and is backed off against a reference voltage obtained from a voltage reference source 73. As in the case of the generator controller illustrated in Figure 4, the difference voltage is developed across the input resistor 27 of the amplifier. Likewise, the position of the slider of the potentiometer 72 is adjusted so that this difference voltage is zero when the motor is running at its correct speed.

In other respects the method of operation and the adjustment of the apparatus are the same as described in connection with Figure 4 for the regulation of a D. C. generator except that the phase relationships through the control apparatus are arranged to be such that when the motor speed is above the correct value and the output voltage of the tachometer generator is, therefore, too great, there will be a resulting increase in the mean voltage in the shunt field circuit of the motor. The resulting increased excitation produces a greater back electromotive force in the motor armature, with a consequent reduction in the driving torque so that the motor slows down, thereby reducing the speed error.

What we claim as our invention is:

1. Apparatus for regulation of a direct current operated machine having a field winding, comprising a magnetic amplifier having a control circuit for control of saturation in said amplifier and having a primary circuit including two series connected primary windings, means for supplying said control circuit with a voltage proportional to errors in regulation of said machine; said primary circuit comprising in series connection in this order; said primary windings, a first, a second, a third and a fourth direct current rectifier, the first and fourth rectifiers being connected in the same polarity and the second and third rectifiers being connected in opposite polarity to the first and fourth; a source of alternating current connected to the common connection between the second and third rectifiers and the common connection between said primary windings; said field winding and a source of direct current being series connected across the second and third rectifiers, said source of direct current being connected in such polarity as to supply current through the second and third rectifiers, a circuit for comparing a voltage dependent on regulation of the machine with a predetermined reference voltage thereby obtaining a difference voltage proportional to errors in regulation of said machine, a voltage amplifier for amplifying said difference voltage, and connections for supplying the amplified difference voltage to the control circuit of the magnetic amplifier.

2. Apparatus for regulation of a direct current generator having a shunt field winding, comprising a magnetic amplifier having a control circuit for control of saturation in said amplifier and having a primary circuit including two series connected primary windings, means for supplying said control circuit with a voltage proportional to errors in regulation of said generator; said primary circuit comprising in series connection in this order; said primary windings, a first, a second, a third and a fourth direct current rectifier, the first and fourth rectifiers being connected in the same polarity and the second and third rectifiers being connected in opposite polarity to the first and fourth; a source of alternating current connected to the common connection between the second and third rectifiers and the common connection between said primary windings; said field winding and a source of direct current being series connected across the second and third rectifiers, said source of direct current being connected in such polarity as to supply current through the second and third rectifiers, a circuit for comparing the output voltage of said generator with a predetermined reference voltage thereby obtaining a difference voltage proportional to errors in regulation of said generator, a voltage amplifier for amplifying said difference voltage, and connections for supplying the amplified difference voltage to the control circuit of the magnetic amplifier, the voltage amplifier and the magnetic amplifier having time constants which are short compared to that due to the inductance of said shunt field winding.

3. Apparatus for regulation of a direct current generator having a shunt field winding, comprising a magnetic amplifier having a control circuit for control of saturation in said amplifier and having a primary circuit including two series connected primary windings, means for supplying said control circuit with a voltage proportional to errors in regulation of said generator; said primary circuit comprising in series connection in this order; said primary windings, a first, a second, a third and a fourth direct current rectifier, the first and fourth rectifiers being connected in the same polarity and the second and third rectifiers being connected in opposite polarity to the first and fourth; a source of alternating current connected to the common connection between the second and third rectifiers and the common connection between said primary windings; said field winding and a source of direct current being series connected across the second and third rectifiers, said source of direct current being connected in such polarity as to supply current through the second and third rectifiers, a circuit for comparing the output voltage of said generator with a predetermined reference voltage thereby obtaining a difference voltage proportional to errors in regulation of said generator, a voltage amplifier for amplifying said difference voltage, connections for supplying the amplified difference voltage to the control circuit of the magnetic amplifier, the voltage amplifier and the magnetic amplifier having time constants which are short compared to that due to the inductance of said shunt field winding, and a source of the direct current normally required to excite said shunt field winding, the primary circuit of the magnetic amplifier supplying only that current required to correct errors in regulation.

4. Apparatus for regulation of a direct current generator having a shunt field winding, comprising a magnetic amplifier having a control circuit for control of saturation in said amplifier and having a primary circuit including two series connected primary windings, means for supplying said control circuit with a voltage proportional to errors in regulation of said generator; said primary circuit comprising in series connection in this order; said primary windings, a first, a second, a third and a fourth direct current rectifier, the first and fourth rectifiers being connected in the same polarity and the second and third rectifiers being connected in opposite polarity to the first and fourth; a source of alternating current connected to the common connection between the second and third rectifiers and the common connection between said primary windings; said field winding and a source of direct current being series connected across the second and third rectifiers, said source of direct current being connected in such polarity as to supply current through the second and third rectifiers, a circuit for comparing a voltage dependent on regulation of the generator with a reference voltage predetermined at the normal value of said voltage dependent on regulation of the generator thereby obtaining a difference voltage proportional to errors in regulation of said generator, a negative-feedback type voltage amplifier for amplifying said difference voltage, and connections for supplying the amplified difference voltage to the control circuit of the magnetic amplifiers.

5. Apparatus for regulation of a direct current generator having a shunt field winding, comprising a magnetic amplifier having a control circuit for control of saturation in said amplifier and having a primary circuit including two series connected primary windings, means for supplying said control circuit with a voltage proportional to errors in regulation of said generator; said primary circuit comprising in series connection in this order; said primary windings, a first, a second, a third and a fourth direct current rectifier, the first and fourth rectifiers being connected in the same polarity and the second and third rectifiers being connected in opposite polarity to the first and fourth; a source of alternating current connected to the common connection between the second and third rectifiers and the common connection between said primary windings; said field winding and a source of direct current being series connected across the second and third rectifiers, said source of direct current being connected in such polarity as to supply current through the second and third rectifiers, a circuit for comparing the output voltage of said generator with a reference voltage predetermined at the normal value of said output voltage thereby obtaining a difference voltage proportional to errors in regulation of said generator, a negative-feedback type voltage amplifier for amplifying said difference voltage, and connections for supplying the amplified difference voltage to the control circuit of the magnetic amplifier, the voltage amplifier and the magnetic amplifier having time constants which are short compared to that due to the inductance of said shunt field winding.

References Cited in the file of this patent

UNITED STATES PATENTS

| | | |
|---|---|---|
| 2,560,698 | Koehler | July 17, 1951 |
| 2,632,145 | Sikourra | Mar. 17, 1953 |
| 2,663,833 | Fisher | Dec. 22, 1953 |
| 2,677,097 | Carleton | Apr. 27, 1954 |

OTHER REFERENCES

"Analysis and Design of Self-Saturable Magnetic Amplifiers," pages 1009–1020, Proceedings of the I. R. E., September 1951 pages 1016 and 1017 relied on).